United States Patent Office 3,364,084
Patented Jan. 16, 1968

3,364,084
PRODUCTION OF EPITAXIAL FILMS
Robert A. Ruehrwein, Dayton, Ohio, assignor to Monsanto Company, St. Louis, Mo., a corporation of Delaware
No Drawing. Continuation-in-part of application Ser. No. 821,101, June 18, 1959. This application May 29, 1961, Ser. No. 129,919
14 Claims. (Cl. 148—175)

This application is a continuation-in-part of copending U.S. application Ser. No. 821,101, filed June 18, 1959.

The present invention relates to a method for the production of epitaxial films of large single crystals of inorganic compounds. Epitaxial films which may be prepared in accordance with the invention described herein are prepared from volatile compounds of elements of Group III–B of the Periodic System having atomic weights of from 10 to 119 with volatile compounds of elements of Group V–B having atomic weights of from 12 to 133. Typical compounds within this group include the binary compounds boron phosphide, gallium arsenide, indium arsenide, gallium phosphide and indium phosphide. As examples of ternary compositions within the defined group are those having the formulae $GaAs_xP_{1-x}$ and $InAs_xP_{1-x}$, $x$ having a numerical value greater than zero and less than 1.

It is an object of this invention to provide a new and economical method for the production of the above described class of compounds which are characterized as having a crystalline structure and existing as well-defined single crystals.

A still further object of this invention is formation and deposition of epitaxial films of the above-described materials upon substrates of the same or different materials.

The III–B and V–B compounds of this invention are of unusual purity and have the necessary electrical properties for use as semiconductor components and are prepared by the reaction of a gaseous III–B compound, such as boron halide and a gaseous V–B compound, such as phosphorus halide in the presence of hydrogen. Examples of boron compounds which are gaseous under the present reaction conditions include the boron halides, e.g., boron trichloride, boron tribromide, and boron triiodide; and also alkyl boron compounds such as trimethyl boron, triethyl boron, tripropyl boron, triiso-propyl boron, and tritert-butyl boron, as well as alkylated boranes, such as ethyl alkylated pentaborane, and ethyl alkylated decaborane having variable degrees of alkylation; and boron hydrides including diborane, pentaborane and decaborane. Other Group III–B starting materials which are employed in the present invention include the corresponding halides and akyl compounds of aluminum, gallium and indium. Such metals are preferably employed as the halides, for example, the chlorides, bromides and iodides, although the various alkyl and halo-alkyl derivatives may similarly be used, e.g., trimethyl gallium, trimethyl aluminum, trimethyl indium, triethyl gallium, methyl gallium dichloride, triethyl aluminum and triisobutyl aluminum. The Group V–B compounds which are of particular utility include the halides, hydrides and alkyl derivatives of aresnic and phosphorous. The chlorides are preferred as the source material for the Group V–B components employed in the present method. The phosphorus halides which are contemplated include phosphorus trichloride, phosphorus tribromide and phosphorus triiodide, phosphorus pentachloride and phosphorus pentabromide.

In conducting the vapor phase reaction between the Group III–B and the Group V–B component for the production of a crystalline solid III–B, V–B compound, it is essential that gaseous hydrogen be present in the system, and that oxidizing gases be excluded. However, when the Group III–B and/or V–B hydrides are used it is unnecessary to use molecular hydrogen, but it may be used as a carrier. The mole fraction of the III–B component in the gas phase (calculated as the mole fraction of the monatomic form of the III–B compound) preferably is from 0.01 to 0.15, while the mole fraction of the V–B component is from 0.05 to 0.50 (also calculated with respect to the monatomic form of the V–B compound). The mole fraction of the hydrogen may vary in the range of from 0.35 to 0.94. It should be recognized that this representation of partial pressure imposes no limitation upon the total pressure in the system which may vary in the range of from 0.1 microns to several atmospheres, for example, 7500 mm. Hg.

The mole fraction of the Group V–B starting material such as halide, for example, phosphorus trichloride, is preferably at least equivalent to, and still more preferably greater than the mole fraction of the Group III–B halide, for example, gallium trichloride, or other Group III–B compound which is employed. A preferred embodiment is the use of a mole fraction for the Group V–B compound which is at least twice that of the Group III–B compound. The mole fraction of hydrogen should then be at least twice that of the combined mole fraction of the Group III and Group V halides.

The temperature used in carrying out the reaction between the above described III–B compound and the V–B compound in the presence of hydrogen will generally be above about 400° C. to as much as 1500° C., a preferred operating range being from 600° C. to 1300° C. Still more preferred ranges of temperatures for making individual products constituting species within the generic temperature range are:

| | °C |
|---|---|
| BP | 700–1200 |
| InP | 500–1000 |
| GaP | 700–1200 |
| GaAs | 600–1200 |
| InAs | 500–900 |
| AlP | 500–1000 |
| AlAs | 700–1200 |
| InSb | 400–500 |
| GaSb | 500–650 |
| AlSb | 700–1000 |
| BN | 800–1200 |
| AlN | 600–1200 |

The only temperature requirements are that the temperatures within the III–B reservoir and in the tube containing the V–B compound be maintained above the dew points of the vaporized components therein. For the III–B compound this is usually within the range of from 80–1000° C. and for the V–B compound, from −100 to 400° C. The time required for the reaction is dependent upon the temperature and the degree of mixing and reacting. The III–B and V–B gaseous components may be introduced individually through nozzles, or may be premixed as desired.

The apparatus employed in carrying out the process of the present invention may be any of a number of types. The simplest type constitutes a closed tube of a refractory material such as glass, quartz or a ceramic tube such as mullite into which the crude reactant materials are introduced together with the hydrogen vapor. The tube is then sealed off and subjected to temperatures within the range of from 400 to 1500° C. for a period of from less than one minute to one hour or more, until the reaction is complete.

The contacting and vapor phase precipitation may be carried out in a closed system which is completely sealed off after the hydrogen is introduced with the III–B compound and the V–B compound, or by use of a continuous gas flow system. The pressure which is obtained in the single-vessel, closed system corresponds to the pressure exerted by the added hydrogen vapor at the operating temperature. The pressure in the system may be varied over a considerable range such as from 0.1 micron to 10 atmospheres, a preferred range being from 0.5 to 1.0 atmosphere.

On a larger scale, the present process is operated as a continuous flow system. This may constitute a simple reaction tube in which the seed crystal is located and in which the hydrogen gas is then passed to flush oxygen from the system. Into this tube are passed the III–B and V–B reactants carried by hydrogen along the same or one or more additional conduits. The III–V compound formed in the reaction tube deposits as an epitaxial layer on the seed crystal. Various other modifications including horizontal and vertical tubes are also contemplated, and recycle systems in which the exit gas after precipitation of the single crystal product is returned to the system is also desirable, particularly in larger scale installations.

An advantage of the present method for the production of epitaxial films of III–B, V–B compounds by the reaction in the vapor phase of a Group III–B compound and a Group V–B compound, preferably the halides, in the presence of hydrogen is the ease of obtaining high purity products. In contrast to this method, the conventional method for the preparation of III–V compounds beginning with the respective elements from the Group III and Group V series requires a difficult purification technique for the metals. The conventional purification procedures are not as effective when dealing with the metals in contrast to the compounds employed in the present invention. For example, distillation, recrystallization and other conventional purification methods are readily applicable to the starting compounds employed in the present process. Furthermore, the high-temperature vapor-phase reaction employed in the present method inherently introduces another factor favoring the production of pure materials, since the vaporization and decomposition of the respective Group III and Group V compounds, e.g., the halides, results in a further rejection of impurities. The desired reaction for the production of the III–B, V–B compound occurs between the Group III–B compound, the Group V–B compound, and hydrogen to yield the III–V compound. As a result, it is found that unusually pure materials which are of utility in various electrical and electronic applications such as in the manufacture of semiconductors are readily obtained.

The most important aspect of this invention is the provision of a means of preparing and depositing epitaxial films of the purified single crystal material onto various substrates. These deposited films permit the fabrication of new electronic devices discussed hereinafter. The characteristic feature of epitaxial film formation is that starting with a given substrate material, e.g., gallium arsenide, having a certain lattice structure and oriented in any direction, a film, layer or overgrowth of the same or different material may be vapor-deposited upon the substrate. The vapor deposit has an orderly atomic lattice and settling upon the substrate assumes as a mirror-image the same lattice structure and geometric configuration of the substrate. When using a certain material, e.g., gallium arsenide, as the substrate and another material, e.g., indium phosphide as the film deposit it is necessary that lattice distances of the deposit material closely approximate those of the substrate in order to obtain an epitaxial film.

A particular advantage of the present method for the production of epitaxial films of III–B, V–B compounds by the reaction in the vapor phase of a Group III–B compound and a volatile Group V–B compound in the presence of hydrogen is that in forming the epitaxial layer on the substrate, the substrate is not affected and therefore sharp changes in impurity concentration can be formed. By this method it is possible to prepare sharp and narrow junctions, such as p-n junctions, which cannot be prepared by the conventional methods of diffusing and alloying.

The thickness of the epitaxial film may be controlled as desired and is dependent upon reaction conditions such as temperatures within the reactor, hydrogen flow rates and time of reaction. In general, the formation of large single crystals and thicker layers is favored by higher temperatures as defined above, and lower hydrogen pressures and larger flow rates.

As stated hereinbefore, the epitaxial films formed in accordance with this invention comprise compounds formed from elements of Group III–B of the Periodic System and particularly those having atomic weights of from 10 to 119 and elements selected from Group V–B having atomic weights of from 12 to 133. Included in this group of compounds are the nitrides, phosphides, arsenides and antimonides of boron, aluminum, gallium and indium. The bismuthides and thallium compounds, while operable, are less suitable. In addition to the use of the above compounds by themselves, mixtures of these compounds are also contemplated as epitaxial films, e.g., aluminum nitride and indium antimonide mixed in varying proportions when produced by the instant process produce suitable semiconductor compositions.

Other combinations of elements within the above group which are contemplated herein include ternary and quaternary compositions, or mixed binary crystals, such as combinations having the formulae $GaAs_xP_{1-x}$, $InAs_xP_{1-x}$, $$GaP_xN_{1-x}, AlP_xAs_{1-x}, Ga_xIn_{1-x}As, Ga_xIn_{1-x}P$$

$$In_xGa_{1-x}Sb, Ga_xAl_{1-x}P, Ga_yIn_{1-y}As_xP_{1-x}$$

and $GaAs_x(P_yN_{1-y})_{1-x}$, where $x$ and $y$ have a numerical value greater than zero and less than 1.

Materials useful as substrates herein include the same materials used in the epitaxial films as just described and, in addition, compounds of elements of Groups II and VI (II–VI compounds) and compounds of Groups I and VII elements (I–VII compounds), and the elements silicon and germanium are suitable substrates. Suitable dimensions of the seed crystal are 1 mm. thick, 10 mm. wide and 15–20 mm. long, although larger or smaller crystals may be used.

As will be described hereinafter, the materials used herein either as films or substrates or both may be used in a purified state or containing small amounts of foreign materials as "doping" agents.

The significance of structures having epitaxial films is that electronic devices utilizing "surface junctions" may readily be fabricated. Devices utilizing n-p or p-n junctions are readily fabricated by vapor depositing the host material containing the desired amount and kind of impurity, hence, conductivity type, upon a substrate having a different conductivity type. In order to obtain a vapor deposit having the desired conductivity type and resistivity, trace amounts of an impurity, e.g., an element or compound thereof selected from Group II of the periodic system, e.g., beryllium, magnesium, zinc, cadmium and mercury are incorporated into the reaction components in order to produce p-type conductivity, and tin or a tin compound such as tin tetrachloride or an element from Group VI, e.g., sulfur, selenium and tellurium, to produce n-type conductivity. These "impurities" are carried over with the reactant materials into the vapor phase and deposited in a uniform dispersion in the epitaxial film of the formed product on the substrate. Since the proportion of dopant deposited with the III–V compound is not necessarily equal to the proportion in the reactant gases the quantity of dopant added corresponds to the level of carrier concentration desired in epitaxial film to be formed.

The doping element may be introduced in any manner known in the art, for example, by chemical combination with or physical dispersion within the reactants. Other examples include adding volatile dopant compounds such as SnCl$_4$ to the reservoir of the Group III–B and/or V–B components, or the dopant can be added with a separate stream of hydrogen from a separate reservoir.

The substrate materials used herein may be doped by conventional means known to the art. For example, the doping agent may be introduced in elemental form or as a volatile compound of the dopant element during preparation of the substrate crystal in the same manner described above for doping the epitaxial film. Also, the dopant may be added to a melt of the substrate compound during crystal growth of the compound. Another method of doping is by diffusing the dopant element directly into the substrate compound at elevated temperatures.

The quantity of dopant used will be controlled by the electrical properties desired in the final product. Suitable amounts contemplated herein range from $1 \times 10^{15}$ to $5 \times 10^{20}$ atoms/cc. of product.

Vapor deposits of the purified material having the same conductivity type as the substrate may be utilized to form intrinsic pp$^+$ or nn$^+$ regions.

Variations of the preceding techniques permit the formation of devices having a plurality of layers of epitaxial films each having its own electrical conductivity type and resistivity as controlled by layer thickness and dopant concentration. Since the vapor deposited material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., gallium arsenide is vapor deposited upon a substrate of germanium. Subsequently, a quantity of the same material with different doping agents or different concentrations of the same dopant or another of the described materials, e.g., indium phosphide may be vapor deposited from starting materials comprising these elements with a fresh quantity of hydrogen as a second epitaxial film over the epitaxial film of gallium arsenide already deposited on the substrate. This procedure with any desired combination of epitaxial and non-epitaxial layers can be repeated any number of times.

Alternatively, after the first layer of material is vapor deposited upon the substrate, the substrate with this epitaxial layer is removed to another reaction tube and a second material is then vapor deposited as before upon the substrate with its first epitaxial layer, thereby forming a two-layered component.

In each of these processes, the thickness of the film and the impurity concentration are controllable to obtain a variety of electrical effects required for specific purposes as discussed elsewhere herein.

Various electronic devices to which these epitaxially filmed semiconductors are applicable include diodes, (e.g., tunnel diodes), parametric amplifiers, transistors, high frequency mesa transistors, solar cells, thermophotovoltaic cells, components in micromodule circuits, rectifiers, thermoelectric generators, radiation detectors, optical filters, watt-meters, and other semiconductor devices.

The invention will be more fully understood with reference to the following illustrative specific embodiments:

*Example 1*

This example illustrates the formation and deposition of an epitaxial film of p-type GaAs on n-type GaAs as the substrate.

A polished seed crystal of n-type GaAs weighing 2.88 g. and containing $5.8 \times 10^{18}$ carriers/cc. of tellurium dispersed therein placed in a fused silica reaction tube located in a furnace. The GaAs seed crystal is placed on a graphite support inside said tube. The reaction tube is heated to 1000° C. and a stream of hydrogen is directed through the tube for 15 minutes to remove oxygen from the surface of the GaAs.

A stream of hydrogen is then directed through a reservoir of GaCl$_3$ maintained at about 130° C. thus vaporizing the GaCl$_3$ which is then carried by the hydrogen through a heated tube from the reservoir to the reaction tube containing the GaAs seed crystal.

Meanwhile, separate and equal streams of hydrogen are conducted through separate tubes containing in one of them a reservoir of arsenic trichloride heated to about 100° C. and in the other a body of zinc chloride heated to about 360° C. From the heated tubes the arsenic trichloride and zinc chloride are carried by the hydrogen on through the tubes to the reaction tube. In the system the mole fractions of the GaCl$_3$, AsCl$_3$ and hydrogen are 0.05, 0.15 and 0.80, respectively. The separate streams of vaporized AsCl$_3$, GaCl$_3$ and zinc chloride conjoin in the fused silica reaction tube where a reaction occurs between the arsenic and gallium in which a single crystal film of p-type gallium arsenide is formed on the seed crystal of n-type gallium arsenide forming thereon an epitaxial layer which exhibits about $10^{18}$ carriers (holes) per cc. The seed crystal after 5 hours weighs 3.44 g.

X-ray diffraction patterns of the substrate crystal show that the deposited layer is single crystal in form and oriented in the same fashion as the substrate.

Point contact rectification tests show that a p–n junction exists at the region of the junction between the epitaxial layer and the seed crystal substrate.

*Example 2*

The same procedure outlined in Example 1 is repeated but phosphorus trichloride heated to about 60° C. is substituted for the arsenic trichloride and gallium tribromide heated to about 230° C. is substituted for gallium trichloride. In this example, a seed crystal of n-type GaP weighing 1.45 g. and containing about $5.5 \times 10^{18}$ carriers/cc. of sulfur dispersed therein is used. The partial pressures of the GaBr$_3$, PCl$_3$, and H$_2$ are 0.10, 0.20 and 0.70, respectively.

In the reaction tube, the vaporous GaBr$_3$, PCl$_3$, zinc dopant and hydrogen react to form p-type GaP which precipitates from the vapor phase onto the seed crystal of n-type GaP. The reaction is allowed to proceed for 7 hours, after which the GaP is removed from the reaction tube, weighed and is found to have increased in weight by 0.01 g. The crystal upon X-ray examination is found to consist of an overgrowth of single crystal p-type GaP having the same crystal orientation as the n-type GaP substrate. The crystal exhibits rectification showing that a p-n junction exists at the boundary between the epitaxial overgrowth and the substrate.

*Example 3*

This example illustrates the formation of a product having an n-type InP overgrowth on a p-type GaAs substrate.

The apparatus and procedure outlined in Examples 1 and 2 are used and followed generally, except that the reservoir containing the III–B compound, i.e., indium trichloride also contains a quantity of a volatile compound to be used as the doping agent for the vapor-deposited compound. To the indium trichloride in the reservoir is added TeCl$_4$ in the amount corresponding to 0.01% of the amount of InCl$_3$, i.e., a sufficient quantity to yield $1 \times 10^{19}$ carriers/cc. in the deposited product. In a second tube leading to the reaction tube is a reservoir of phosphorus trichloride.

A seed crystal of gallium arsenide containing about $5.7 \times 10^{18}$ carriers/cc. zinc dispersed therein to provide p-type conductivity, is placed in the reaction tube located in the furnace. The furnace is then heated to 800° C. and a stream of hydrogen directed through the reaction tube for about 20 minutes to remove any oxygen present.

The reservoir of indium chloride containing the tellurium chloride is heated to 430° C. to volatilize the components which are conducted by a stream of hydrogen passing through the reservoir, to the reaction tube. Simultaneously, the second tube containing the phosphorus trichloride is heated to about 60° in the presence of a stream of hydrogen. The vaporized phosphorus trichloride is also carried to the reaction tube wherein the indium chloride reacts with the phosphorus trichloride and hydrogen in the presence of the tellurium dopant to produce n-type indium phosphide which deposits from the vapor phase as a uniform layer upon the seed crystal of p-type gallium arsenide.

The product, upon examination shows an epitaxial layer of single crystal indium phosphide having the same crystal orientation as the gallium arsenide substrate and exhibits rectification indicating the existence of a p-n junction between the epitaxial layer and the substrate.

*Example 4*

This example illustrates the preparation of an indium phosphide substrate having deposited thereon an epitaxial overgrowth of aluminum antimonide.

The procedure described in the preceding example is repeated, except that the seed crystal used is p-type indium phosphide containing about $5.1 \times 10^{17}$ carriers/cc. of cadmium dispersed therein. The reservoir containing the III–B compound, i.e., methyl aluminum dichloride also contains sufficient tin chloride doping agent to dope the subsequently formed aluminum antimonide to a carrier concentration of about $1 \times 10^{20}$ carriers/cc. The V–B compound used in this example is antimony trichloride. The tube containing the reservoir of antimony trichloride is heated to 200° C. while passing a stream of hydrogen therethrough, while the methyl aluminum dichloride and tin tetrachloride are heated to 200° C. in a stream of hydrogen. These separate streams of hydrogen containing the vaporized reactants are then conducted to the reaction tube which is heated to 1000° C. and contains the indium phosphide seed crystal. Here, the vaporized reactants intermix forming aluminum antimonide containing the tin doping agent dispersed therein. This product precipitates from the vapor phase and deposits on the indium phosphide seed crystal.

Again, X-ray diffraction patterns of the substrate crystal show that the deposited layer is single crystal in form and oriented in the same manner as the substrate.

Point contact rectification tests show the presence of a p-n junction as in preceding examples.

*Example 5*

This example illustrates the procedure for producing a product having a plurality of layers of different electrical properties.

The procedure here is similar to that followed in the preceding example, and the apparatus is the same.

The reservoir containing the III–B compound, gallium triiodide, is heated to 350° C. in a stream of hydrogen, while the tube containing a reservoir of arsenic triiodide is heated to about 390° C. in a stream of hydrogen and a separate tube containing $ZnCl_2$ is heated to about 360° C. in a stream of hydrogen. These separate streams of hydrogen containing the vaporized reactants are conducted to the reaction tube which contains a seed crystal of polished elemental germanium doped to a carrier concentration of about $5.8 \times 10^{18}$ atoms/cc. of phosphorus. In the reaction tube previously flushed with hydrogen and heated to 900° C., the gallium triiodide reacts with the hydrogen, arsenic triiodide and zinc chloride dopant to form p-type gallium arsenide which deposits from the vapor phase onto the n-type germanium seed crystal. The reaction proceeds for about 15 minutes, after which the flow of the separate streams of hydrogen is discontinued temporarily. A fresh supply of arsenic triiodide doped with a trace amount of tellurium tetraiodide is added to replace the original arsenic source.

After the fresh source of arsenic triiodide is charged to the system, the hydrogen supply is again opened to stream through the III–B compound reservoir, again heated to 350° C. and the arsenic triiodide-tellurium tetraiodide source heated to 390° C. Again, the vaporized reactants are carried by the hydrogen to the reaction tube heated to 1000° C. In the reaction tube the gallium triiodide reacts with the doped arsenic triiodide to form n-type gallium arsenide which deposits upon the p-type gallium arsenide layer previously deposited on the n-type germanium seed crystal.

After the reaction has proceeded to completion, the product, upon examination is found to consist of a substrate of n-type germanium, having successive layers of p-type gallium arsenide and n-type gallium arsenide. These deposited layers exhibit the same X-ray orientation pattern as the single crystal germanium substrate indicating the same orientation and single crystal form characteristic of epitaxial films.

The product further exhibits characteristic n-p-n junction properties showing the presence of an n-p junction between the n-type gallium arsenide and the p-type gallium arsenide and a p-n junction between the latter compound and the n-type germanium substrate. When this example is repeated substituting silicon for germanium, substantially similar results are obtained.

By this method any number and combination of epitaxial and non-epitaxial layers may be deposited one upon the other.

An alternative to the foregoing procedure is to connect a fourth tube containing a second III–B compound reservoir and hydrogen supply to the reaction tube at a point near the junction of the tube containing the first III–B compound reservoir and the tube containing the V–B compound reservoir. The fourth tube is closed off during the first phase of the process, i.e., while the first epitaxial layer is being formed, and thereafter, opened to the system while closing off the tube containing the first III–B compound.

A still further modification of this invention is to use a mixture of Group III–B compounds in one or more reservoirs and/or a mixture of the Group V–B compounds in another reservoir(s) and proceed in the usual manner. An illustration of this modification is shown in the following example wherein an epitaxial film of a ternary composition of III–V elements is deposited on a gallium phosphide substrate.

*Example 6*

A polished seed crystal of p-type gallium phosphide containing $5.5 \times 10^{18}$ carriers/cc. of zinc dispersed therein is placed in the fused silica reaction tube. The tube is heated to 1000° C. and a stream of hydrogen is directed through the tube for 15 minutes to remove any oxygen present.

A mixture of gallium trichloride and indium trichloride is placed in the reservoir for the III–B compound reactant as described in preceding examples, and a body of phosphorus trichloride is placed in another tube connected to the reaction tube. The phosphorus trichloride contains about 0.1% of sulfur monochloride.

A stream of hydrogen is then directed through the reservoir containing the mixture of III–B halides and heated to about 130° C., while a stream of hydrogen is then passed through the phosphorus trichloride reservoir in the other tube heated to about 60° C. The vaporized components in both tubes are then carried by the hydrogen to the reaction tube containing the gallium phosphide seed crystal. In the reaction tube heated to 1000° C., the vaporized gallium chloride-indium chloride mixture combines and reacts with the hydrogen, vaporized phosphorus trichloride and sulfur chloride to form a mixed binary crystal of gallium indium phosphide which deposits from the vapor phase in single crystal form as an epitaxial film on said p-type gallium phosphide seed crystal. The p-type mixed crystal layer is shown by X-ray diffraction patterns to have the same crystal orientation as the seed crystal, characteristic of epitaxial layers.

Rectification tests establish the existence of a p-n junction between the epitaxial layer and the substrate.

By varying the hydrogen flow rates through the respective III–B and V–B compound reservoirs according to the foregoing modification of this example, epitaxial films of ternary compositions over the whole range of $$Ga_xIn_{1-x}P$$

are obtained, where $x$ has a value less than 1 and greater than zero.

In accordance with the present embodiment of this invention, epitaxial films of ternary compositions of III–B, V–B elements may be prepared merely by reacting one volatile compound of Group III–B elements with two Group V–B compounds or vice-versa, i.e., by reacting two Group III–B compounds with one Group V–B compound in the presence of hydrogen. Thus, epitaxial films of these ternary compositions may be formed by reacting a sum of three Group III–B compounds and Group V–B compounds in any combination in the presence of hydrogen.

*Example 7*

This example illustrates the preparation of epitaxial films of quaternary mixed binary crystals of III–V elements.

A mixture of gallium and indium trichlorides is placed in one reservoir and a mixture of arsenic trichloride and phosphorus trichloride containing a small amount of tellurium tetrachloride is placed in a second reservoir. Both reservoirs are connected to a quartz tube containing a polished seed crystal of zinc-doped GaAs. (This arrangement may be varied a number of ways, e.g., by placing each reactant in separate reservoirs along a common conduit to the reaction tube or each reservoir may have its own conduit to the reaction tube.)

The reservoir containing the gallium and indium trichlorides is then heated to about 130° C. and the reservoir containing the tellurium tetrachloride-doped phosphorus trichloride-arsenic trichloride mixture is heated to about 100° C. while hydrogen streams are directed through both tubes. The vaporized components in both reservoirs are then conducted by the hydrogen through quartz tubes to the reaction tube which is heated to about 1100–1150° C. The separate streams of hydrogen carrying the reactants converge in the reaction tube where the gallium and indium trichlorides are reacted with the phosphorus and arsenic trichlorides containing tellurium tetrachloride for about 1 hour in the presence of hydrogen to form a four-component mixed binary crystal having the formula $Ga_{0.7}In_{0.3}As_{0.1}P_{0.9}$ which deposits as an epitaxial film on the GaAs seed crystal.

This product having a gallium arsenide substrate of p-type conductivity and an epitaxial film of n-type conductivity exhibits rectification suitable for use in semiconductor devices.

Similarly, other four-component mixed binary crystals of III–V compounds may be deposited as epitaxial films merely by reacting in the presence of hydrogen at least one volatile compound of Group III–B elements with at least one volatile Group V–B compound, provided that the sum of the III–B compounds and the V–B compounds reacted equals four. That is, one, two or three Group III–B compounds may be reacted with, respectively, three, two or one Group V–B compounds in the presence of hydrogen to produce epitaxial films of the quaternary compositions of III–V elements in this embodiment of the present invention.

*Example 8*

This example illustrates the deposition of an epitaxial film of indium arsenide onto a substrate of a I–VII compound having the cubic zinc blende structure typified by single crystal iodide.

A polished seed crystal of single crystal copper iodide having approximate dimensions of 2 mm. thick, 15 mm. wide and 20 mm. long is placed in a fused silica reaction tube located in a furnace. The reaction tube is heated to 550° C. and a stream of hydrogen is directed through the tube for 15 minutes to remove oxygen from the system.

A stream of hydrogen is then directed through a reservoir of $InCl_3$ containing about 0.0001% $TeCl_4$ and maintained at about 430° C. thus vaporizing the $InCl_3$ and $TeCl_4$ which are then carried by the hydrogen through a heated tube from the reservoir to the reaction tube containing the copper iodide seed crystal.

Meanwhile, a separate and equal stream of hydrogen is conducted through a separate tube containing a body of arsenic trichloride heated to 100° C. From this heated tube the vaporized arsenic trichloride is carried by the hydrogen on through the tube to the reaction tube. In the system, the mole fractions of $InCl_3$, arsenic trichloride and hydrogen are 0.05, 0.15 and 0.80, respectively.

The separate streams of hydrogen from the $InCl_3$ and arsenic trichloride conjoin in the fused silica reaction tube where a reaction occurs between the hydrogen, arsenic trichloride and indium trichloride in which a single crystal form of n-type indium arsenide is formed as a film-deposit on the single crystal copper iodide substrate.

X-ray diffraction patterns of the film deposit and substrate show that the deposited layer is single crystal in form and has the same lattice orientation as the substrate, hence, the indium arsenide forms an epitaxial film on the single crystal copper iodide substrate.

The Hall coefficient of the film of InAs on the copper iodide substrate is found to be $-300$ cm.$^3$/coulomb, making it of utility in magnetic Hall devices. The film also exhibits photoconduction.

While the foregoing example has illustrated the use of single crystal I–VII compounds using copper iodide as the substrate, in a similar manner the fluorides, chlorides, bromides and iodides of copper, silver and gold are likewise used as substrates for epitaxial overgrowths of III–V compounds. Similarly, single crystal I–VII compounds having the cubic sodium chloride type structure may be used as substrate for epitaxial growth of III–V compounds when the I–VII crystal face upon which growth is to occur is the (III) crystallographic face. In this manner, the fluorides, chlorides, bromides and iodides of sodium, lithium, potassium, rubidium and cesium are used as substrates. Preferred I–VII compounds include copper fluoride, copper chloride, copper bromide, copper iodide and silver iodide.

*Example 9*

This example illustrates the deposition of an epitaxial film of gallium arsenide onto a substrate of a II–VI compound having the cubic zinc blende structure typified by single crystal zinc selenide.

A polished seed crystal of single crystal n-type zinc selenide (doped with boron) having approximate dimensions of 2 mm. thick, 100 mm. wide and 15 mm. long is placed in a fused silica reaction tube located in a furnace. The reaction tube is heated to 850° C. and a stream of hydrogen is directed through the tube for 15 minutes to remove oxygen therefrom.

A stream of hydrogen is then directed through a reservoir of gallium chloride maintained at 130° C. thus vaporizing the gallium chloride which is then carried by the hydrogen through a heated tube from the reservoir to the reaction tube containing the zinc selenide seed crystal.

Meanwhile, separate and equal streams of hydrogen are conducted through two separate tubes containing, respectively, a body of arsenic trichloride heated to 100°

C. and a body of zinc chloride heated to 360° C. From these heated tubes the arsenic trichloride and zinc chloride are carried by the hydrogen on through the tubes to the reaction tube. In the system, the mole fractions of $GaCl_3$, $AsCl_3$ and hydrogen are 0.05, 0.15 and 0.80, respectively.

The separate streams of hydrogen carrying the $GaCl_3$, $AsCl_3$ and $ZnCl_2$ conjoin in the fused silica reaction tube where a reaction occurs between the hydrogen, arsenic trichloride and gallium trichloride in which a single crystal form of p-type gallium arsenide is formed as a fi'm-deposit on the single crystal zinc selenide substrate.

X-ray diffraction patterns of the film deposit and substrate show that the deposited layer is single crystal in form and has the same lattice orientation as the substrate, hence, the gallium arsenide forms an epitaxial film on the single crystal zinc selenide substrate. The crystal exhibits rectification showing that a p-n junction exists at the boundary between the epitaxial overgrowth and the substrate.

While the foregoing example has illustrated the use of single crystal II–VI compounds using zinc selenide as the substrate, in a similar manner the sulfides, selenides and tellurides of beryllium, zinc, cadmium, and mercury are likewise used as substrates for epitaxial overgrowths of III–V compounds. Similarly, single crystal II–VI compounds having the cubic sodium chloride type structure may be used as substrates for epitaxial growth of the III–V compounds when the II–VI crystal face upon which growth is to occur is the (III) crystallographic face. In this manner the oxides, sulfides, selenides and tellurides of magnesium, calcium, strontium and barium, as well as cadmium oxide, are used as substrates. Preferred II–VI compounds include zinc sulfide, zinc selenide, zinc telluride, cadmium sulfide, cadmium selenide, cadmium telluride, mercury sulfide, mercury selenide, mercury telluride, beryllium sulfide, beryllium selenide and beryllium telluride.

It will be seen that the products obtained according to the present invention have a variety of applications. For example, in electronic devices where it is desirable to have a substantially inert non-conducting base for III–V semiconductors, the product described in Example 8 is highly suitable. Where it is desired to obtain semiconductor components having semiconducting properties in the base material as well as in the epitaxial film, those products described in Examples 1–7 and Example 9 above are of particular value.

Electronic devices may also be fabricated wherein a semiconducting component comprising an epitaxial film of III–V compositions is deposited on substrates of metallic conductors having cubic crystal structure, such as gold, silver, calcium, cerium, cobalt, iron, iridium, lanthanum, nickel, palladium, platinum, rhodium, strontium, thorium and copper, and alloys such as Al—Zn, SbCoMn, BTi and $Cr_2Ti$.

Various other modifications of the instant invention will be apparent to those skilled in the art without departing from the spirit and scope thereof.

I claim:

1. Process for the production and deposition of epitaxial films of compounds of Group III–B elements having atomic weights of from 10 to 119 and elements selected from Group V–B having atomic weights of from 12 to 133 and mixtures thereof onto a substrate material crystallographically compatible with said films and selected from the group consisting of III–V compounds, I–VII compounds, II–VII compounds, germanium and silicon, which comprises combining in the vapor phase at least one volatile compound of Group III–B elements together with at least one volatile compound of Group V–B elements in the presence of hydrogen, and contacting the resulting reaction mixture with said substrate whereby a purified single crystal form of at least one III–V compound is deposited from said reaction mixture as an epitaxial film on said substrate.

2. Process for the production and deposition of epitaxial films of compounds of Group III–B elements having atomic weights of from 10 to 119 and elements selected from Group V–B having atomic weights of from 12 to 133 and mixtures thereof onto a substrate material crystallographically compatible with said films and selected from the group consisting of III–V compounds, I–VII compounds, II–VI compounds, germanium and silicon, which comprises combining in the vapor phase at temperatures within the range of from 400 to 1500° C. at least one volatile compound of Group III–B elements selected from the class consisting of halides, hydrides, and alkyl derivatives together with at least one volatile compound of Group V–B elements selected from the group consisting of halides, hydrides and alkyl derivatives in the presence of hydrogen and contacting the resulting reaction mixture with said substrate whereby a purified single crystal form of at least one III–V compound is deposited as an epitaxial film on said substrate.

3. Process according to claim 2 wherein said Group III–B compound is gallium trichloride, said Group V–B compound is arsenic trichloride and said III–V compound deposited as an epitaxial film is gallium arsenide.

4. Process according to claim 2 wherein said Group III–B compound is triethyl gallium, said Group V–B compound is phosphorus triiodide and said III–V compound is gallium phosphide.

5. Process for the production and deposition of epitaxial films of compounds of Group III–B elements having atomic weights of from 10 to 119 and elements selected from Group V–B having atomic weights of from 12 to 133 and mixtures thereof, said compounds having p-type conductivity by incorporation therein of a small amount of a doping agent selected from Group II of the periodic system, onto a substrate material crystallographically compatible with said films and selected from the group consisting of III–V compounds, I–VII compounds, II–VI compounds, germanium and silicon, said substrate having n-type conductivity by incorporation therein of a small amount of a doping agent selected from Group VI of the periodic system, which comprises combining in the vapor phase at least one volatile compound of Group III–B elements together with at least one volatile compound of Group V–B elements in the presence of hydrogen, and contacting the resulting reaction mixture with said substrate whereby a purified single crystal form of at least one III–V compound is deposited from said reaction mixture as an epitaxial film on said substrate forming a p-n junction therewith.

6. Process for the production and deposition of an epitaxial film of p-type gallium arsenide onto a substrate of n-type gallium arsenide, which comprises combining in the vapor phase gallium trichloride with arsenic trichloride in the presence of hydrogen and a doping agent selected from Group II, and contacting the resulting reaction mixture with said substrate whereby a purified single crystal form of gallium arsenide containing a small amount of said doping agent dispersed therein is deposited from said reaction mixture as an epitaxial film having p-type conductivity on said substrate having n-type conductivity thereby forming a p-n junction.

7. Process of the production and deposition of epitaxial films of compounds of Group III–B elements having atomic weights of from 10 to 119 and elements selected from Group V–B having atomic weights of from 12 to 133 and mixtures thereof, said compounds having n-type conductivity by incorporation therein of a small amount of a doping agent selected from Group VI of the periodic system, onto a substrate material crystallographically compatible with said films and selected from the group consisting of III–V compounds, I–VII compounds, II–VI compounds, germanium and silicon, said substrate having p-type conductivity by incorporation therein of a small amount of a doping agent selected from Group II of the perodic system, which comprises combining in the vapor phase at least one volatile compound of Group III–B elements together with at least one volatile compound of Group V–B elements in the presence of hydrogen, and contacting the resulting reaction mixture with said substrate whereby a purified single crystal form of at least one III–V compound is deposited from said reaction mixture as an epitaxial film on said substrate forming a p-n junction therewith.

8. Process for the production and deposition of an epitaxial film of n-type gallium phosphide onto a substrate of p-type gallium phosphide, which comprises combining in the vapor phase gallium tribromide with phosphorus triiodide in the presence of hydrogen and a doping agent selected from Group VI, and contacting the resulting reaction mixture with said substrate, whereby a purified single crystal form of gallium phosphide containing a small amount of said doping agent dispersed therein is deposited from said reaction mixture as an epitaxial film having n-type conductivity on said substrate having p-type conductivity, thereby forming an n-p junction.

9. Process for the production and deposition of epitaxial films of mixed binary crystals comprising elements selected from Group III–B having atomic weights of from 10 to 119 and elements selected from Group V–B having atomic weights of from 12 to 133 onto a substrate material crystallographically compatible with said films and selected from the class consisting of III–V compounds, I–VII compounds, II–VI compounds, germanium and silicon, which comprises reacting in the vapor phase at least one volatile compound of Group III–B elements together with at least one volatile Group V–B compound provided that the sum of the Group III–B compounds and Group V–B compounds reacted is greater than two, in the presence of hydrogen and contacting the resulting reaction mixture with said substrate whereby a purified single crystal form of mixed binary crystals is deposited from said reaction mixture as an epitaxial film on said substrate.

10. Process for the production and deposition of epitaxial films of three-component mixed binary crystals comprising elements selected from Group III–B having atomic weights of from 10 to 119 and elements selected from Group V–B having atomic weights of from 12 to 133 onto a substrate material crystallographically compatible with said films and selected from the class consisting of III–V compounds, I–VII compounds, II–VI compounds, germanium and silicon, which comprises reacting in the vapor phase at least one volatile compound of Group III–B elements together with at least one volatile Group V–B compound, provided that the sum of the Group III–B compounds and Group V–B compounds reacted equals three, in the presence of hydrogen, and contacting the resulting reaction mixture with said substrate material, whereby a purified single crystal form of three-component mixed binary crystals is deposited from said reaction mixture as an epitaxial film on said substrate.

11. Process according to claim 10 whereby said volatile III–B compound is gallium trichloride and said Group V–B compounds are arsenic trichloride and phosphorus trichloride.

12. Process according to claim 11 wherein said mixed binary crystal is gallium arsenide phosphide having the formula $GaAs_xP_{1-x}$ where $x$ has a value greater than zero and less than one, and said substrate is gallium arsenide.

13. Process for the production and deposition of epitaxial films of four-component mixed binary crystals comprising elements selected from Group III–B having atomic weights of from 10 to 119 and elements selected from Group V–B having atomic weights of from 12 to 133, onto a substrate material crystallographically compatible with said films and selected from the class consisting of III–V compounds, I–VII compounds, II–VI compounds, germanium and silicon, which comprises reacting in the vapor phase at least one volatile compound of Group III–B elements together with at least one volatile Group V–B compound, provided that the sum of the Group III–B compounds and Group V–B compounds reacted equals four, in the presence of hydrogen, and contacting the resulting reaction mixture with said substrate material, whereby a purified single crystal form of four-component mixed binary crystals is deposited from said reaction mixture as an epitaxial film on said substrate.

14. Process for the production and deposition of a plurality of epitaxial layers of compounds selected from the group consisting of compounds of Group III–B elements having atomic weights of from 10 to 119 and Group V–B elements having atomic weights of from 12 to 133, and mixtures thereof, onto a substrate material crystallographically compatible with said films and selected from the group consisting of III–V compounds, I–VII compounds, II–VI compounds, germanium and silicon, which comprises as a first step reacting in the vapor phase at least one volatile compound of Group III–B elements together with at least one volatile Group V–B compound in the presence of hydrogen, and contacting said resulting reaction mixture with said substrate whereby a single crystal form of at least one III–V compound is deposited from said vapor phase as a first epitaxial layer on said substrate, repeating this procedure as many times as the number of layers desired, but providing modified electrical properties in each succeeding layer by inclusion therein of small amounts of doping agents.

References Cited

UNITED STATES PATENTS

| | | | |
|---|---|---|---|
| 3,065,113 | 11/1962 | Lyons | 148—175 |
| 3,094,388 | 6/1963 | Johnson et al. | 23—204 |
| 3,131,098 | 4/1964 | Krsek et al. | 148—175 |
| 3,168,422 | 2/1965 | Allegretti et al. | 148—175 |
| 3,312,570 | 4/1967 | Ruehrwein | 148—175 |
| 3,030,189 | 4/1962 | Schweickert et al. | 148—1.5 X |
| 3,072,507 | 1/1963 | Anderson et al. | 148—1.5 X |
| 2,798,989 | 7/1957 | Welker | 148—1.5 X |
| 2,858,275 | 10/1958 | Folberth | 148—1.5 X |

FOREIGN PATENTS

| | | |
|---|---|---|
| 1,029,941 | 5/1958 | Germany. |
| 1,184,921 | 7/1959 | France. |

OTHER REFERENCES

Marinace, "Vapor Growth of Insb. Crystals by an Iodine Reaction," IBM Technical Disclosure Bulletin, vol. 3, No. 8, January 1961, page 33.

DAVID L. RECK, *Primary Examiner.*

RAY K. WINDHAM, HYLAND BIZOT, *Examiners.*

M. A. CIOMEK, N. F. MARKVA, *Assistant Examiners.*